T. PETERSEN.
LINE HOLDER.
APPLICATION FILED MAR. 6, 1908.
958,168.
Patented May 17, 1910.
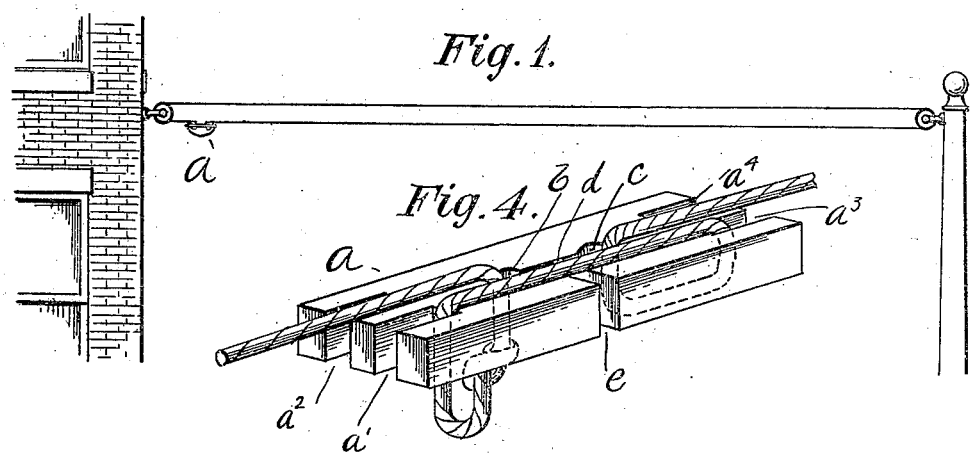
Fig. 1.
Fig. 4.
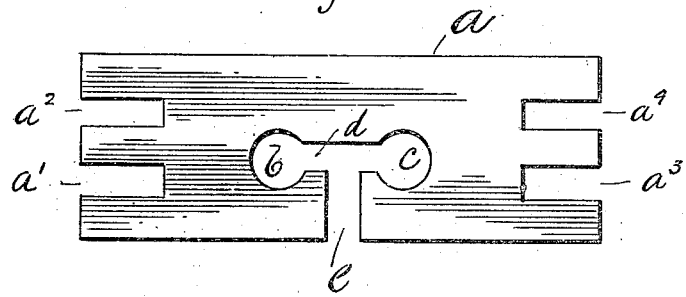
Fig. 2.
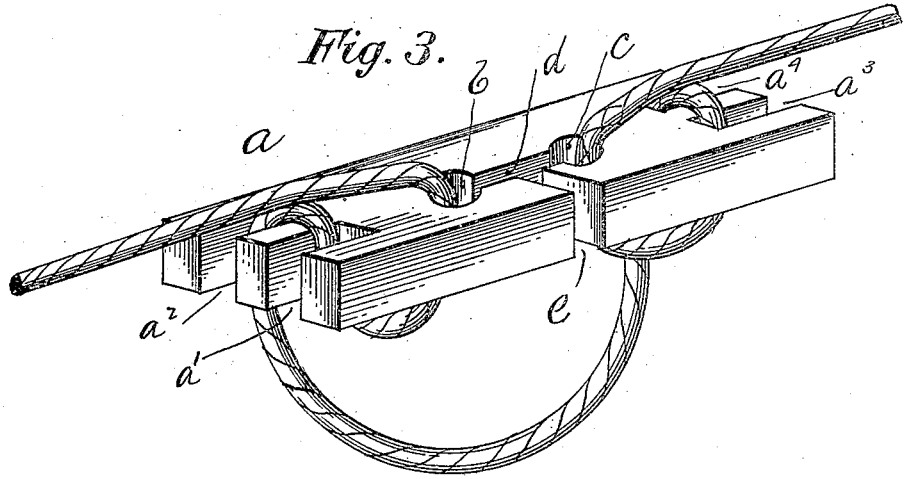
Fig. 3.
WITNESSES:
L. E. Berkovitch
[signature]
INVENTOR.
Thomas Petersen
BY
[signature]
ATTORNEY.

UNITED STATES PATENT OFFICE.

THOMAS PETERSEN, OF HARTFORD, CONNECTICUT.

LINE-HOLDER.

958,168. Specification of Letters Patent. Patented May 17, 1910.

Application filed March 6, 1908. Serial No. 419,463.

*To all whom it may concern:*

Be it known that I, THOMAS PETERSEN, a citizen of the United States, and a resident of Hartford, in the county of Hartford and State of Connecticut, have invented certain new and useful Improvements in Line-Holders, of which the following is a specification.

The object of the invention is to produce a device of the class specified having features of novelty and advantage, the particular object of the invention being to produce a device which can be applied to any line, either single or double run, without cutting the line.

In the drawings—Figure 1 is a general view showing the manner of use of my device. Fig. 2 is a plan view of my holder. Fig. 3 is a perspective view showing one manner of use of my device. Fig. 4 is a perspective view showing a second manner of use of my device.

The device comprises a block of wood or other suitable material $a$ having jam notches at its ends; by preference I employ two notches at each end, indicated at $a^1$ $a^2$ $a^3$ $a^4$. Through the body of the block are two apertures $b$ $c$ connected by a passage $d$ preferably smaller in the width than the diameter of said apertures. A slot $e$ is cut through one side of the block and opens into said passage $d$.

It is apparent that the above-described construction of my line holder permits of its being applied to a line without cutting the line.

Figs. 3 and 4 show two different ways in which it can be used. Where it is desired the line can be fastened to the block without the use of a knot, as indicated in Fig. 3, one part of the line being passed down through the aperture $b$, to the left, up through the notch $a^1$ and down through the notch $a^2$, the other end of the line being passed down through the notch $c$, up through the notch $a^3$ and down through the notch $a^4$. As used in Fig. 4 the line is first knotted, then my device is applied to the line so that it shall pass down through the aperture $b$, the knot resting against the under side of the block; the other end of the line is passed through the slot $e$, passage $d$, into the opening $c$ and this side of the line is drawn down through the block until the line is taut, then brought up through the jam notch $a^3$, across the block and down through the jam notch $a^1$. When the line has become worn, as clotheslines do after use, and the slots are a little large for the line, the line can be passed up through the notch $a^3$, down through the notch $a^4$, across the block up through the notch $a^2$, down through the notch $a^1$.

I am aware that line holders have heretofore been made for taking up the slack in clotheslines but I am not aware that any such holder has been made which is simple in its construction and which can be applied to a line without cutting it.

I claim as my invention:—

A line fastener comprising a member formed at each end with a plurality of longitudinally extending jam notches, each of a width greater than the diameter of the line, said member further provided with a plurality of apertures arranged in longitudinal alinement and each of a diameter greater than the diameter of the line, and said member furthermore provided with a longitudinally extending passage connecting said apertures, said passage less in width throughout than the diameter of said apertures and said passage of greater width throughout than the diameter of the line.

THOMAS PETERSEN.

Witnesses:
D. I. KREIMENDAHL.
LENA E. BERKOVITCH.